(12) United States Patent
Williams et al.

(10) Patent No.: US 6,385,211 B1
(45) Date of Patent: *May 7, 2002

(54) NETWORK CONTROLLER

(75) Inventors: Steven D. Williams, Portland, OR (US); Amir Zinaty, Haifa (IL); Carey W. Smith, Portland, OR (US); Gideon Prat, Haifa (IL)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/136,870

(22) Filed: Aug. 19, 1998

(51) Int. Cl.[7] .................................................. H04J 3/16
(52) U.S. Cl. ...................................... 370/469; 370/458
(58) Field of Search ................................ 370/389, 419, 370/420, 469, 445, 446, 463, 458

(56) References Cited

U.S. PATENT DOCUMENTS

| | | | | |
|---|---|---|---|---|
| 5,758,177 A | * | 5/1998 | Gulick et al. | 395/800.01 |
| 5,764,896 A | * | 6/1998 | Johnson | 395/200.8 |
| 5,784,573 A | * | 7/1998 | Szczepanek et al. | 395/200.8 |
| 5,838,688 A | * | 11/1998 | Kadambi et al. | 370/445 |
| 5,878,028 A | * | 3/1999 | Roy et al. | 370/235 |
| 5,905,870 A | * | 5/1999 | Mangin et al. | 395/200.64 |

OTHER PUBLICATIONS

Stallings, Data and Computer Communications, PP:510–525, 1997.*
"82558B 10/100 Mbps Ethernet Controller: External Architecture Spec (EAS) Addendum," Intel, Oct. 6, 1997, 38 pgs.
"D101M 10/100 Mbps Ethernet Controller: External Architecture Spec (EAS)," Intel, Feb. 25, 1998, 84 pgs.
"PC87782 CompactRISC Intelligent System Mangagement Controller," National Semiconductor, Mar. 1998, 17 pgs.

* cited by examiner

*Primary Examiner*—David R. Vincent
(74) *Attorney, Agent, or Firm*—Howard A. Skaist

(57) ABSTRACT

An integrated circuit includes logic to process a received transport-protocol compliant packet. The logic is adapted to forward at least some portions of the packet so that the portions will be transmitted along an auxiliary bus. The portions are forwarded based, at least in part, on specific binary digital signals being provided in fixed, predetermined locations in the packet.

30 Claims, 3 Drawing Sheets

| BYTE 3 | BYTE 2 | BYTE 1 | BYTE 0 | |
|---|---|---|---|---|
| DESTINATION MAC ADDRESS | | | | 0 |
| | | | | 4 |
| SOURCE MAC ADDRESS | | | | 8 |
| | | FRAME TYPE (0800 h) | | 12 |
| SERVICE TYPE | VERSION/IHL (45h) | TOTAL LENGTH | | 16 |
| IDENTIFICATION | | FRAGMENT OFFSET | FLAGS | 20 |
| PROTOCOL (11h/04h) | TIME TO LIVE | HEADER CHECKSUM | | 24 |
| SOURCE ADDRESS | | SOURCE ADDRESS | | 28 |
| DESTINATION ADDRESS | | DESTINATION ADDRESS | | 32 |
| SOURCE PORT | | DESTINATION PORT | | 36 |
| LENGTH | | CHECKSUM | | 40 |
| PAYLOAD (INC. SECURITY, ...) | | | | 44 |
| PAYLOAD (CONT...) | | | | 48 |

FIG. 3

NETWORK CONTROLLER

BACKGROUND

1. Field

The invention relates to a network controller and, more particularly, to a network controller, such as may be employed in a personal computer (PC), for example.

2. Background Information

As the total cost of ownership for personal computers (PCs) increases, a desire for the ability to service the computer or at least diagnose problems and provide alerts regarding such problems over a network has become more desirable. One issue that arises in trying to construct a system to achieve such a purpose includes the transmitting and receiving of signals, such as signal packets, over the network, that execute, accomplish or facilitate this functionality. In addition, it is further desirable to have this capability even where the host computer or the like is either not operating or not operating properly. A need, therefore, exists for a technique of providing this capability over a network.

SUMMARY

Briefly, in accordance with one embodiment on the invention, a network controller includes: a media access controller (MAC) layer, a physical protocol (PHY) layer, a PCI bus interface, and an auxiliary bus interface. The PCI and auxiliary bus interfaces are coupled in the network controller so as to transmit to and to receive from a network link binary digital signals, the binary digital signals forming transport-protocol compliant packets, via the MAC and PHY layers. The MAC layer is adapted to process and direct at least portions of received packets to an auxiliary bus adapted to be coupled to the auxiliary interface based, at least in part, on specific binary digital signals provided in fixed, predetermined locations in the received transport-protocol compliant packets.

Briefly, in accordance with another embodiment of the invention, a method of directing packets, or portions thereof, received in a network controller to an auxiliary bus includes the following. A transport-protocol compliant packet is received by the network controller, the packet being transported via a network link. The transport-protocol compliant packet is processed. At least portions of the received transport-protocol compliant packet are directed to the auxiliary bus based, at least in part, on specific binary digital signals contained in fixed, predetermined locations in the received transport-protocol compliant packet.

Briefly, in accordance with yet another embodiment of the invention, a method of processing a received transport protocol-compliant signal packet includes the following. At least portions of the received transport-protocol compliant signal packet are forwarded to an auxiliary bus based, at least in part, on specific binary digital signals contained in fixed, predetermined locations in the received transport-protocol compliant packet.

Briefly, in accordance with one more embodiment of the invention, an integrated circuit includes: logic to process a received transport-protocol compliant packet. The logic is adapted to forward at least some portions of the packet so that the portions will be transmitted along an auxiliary bus. The portions are forwarded based, at least in part, on specific binary digital signals being provided in fixed, predetermined locations in the packet.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 is a schematic diagram illustrating on embodiment of a header for a transport-protocol compliant signal packet that includes signals that may be employed by an embodiment of a network controller in accordance with the invention to process and forward the signal packet.

DETAILED DESCRIPTION

Figure 1:
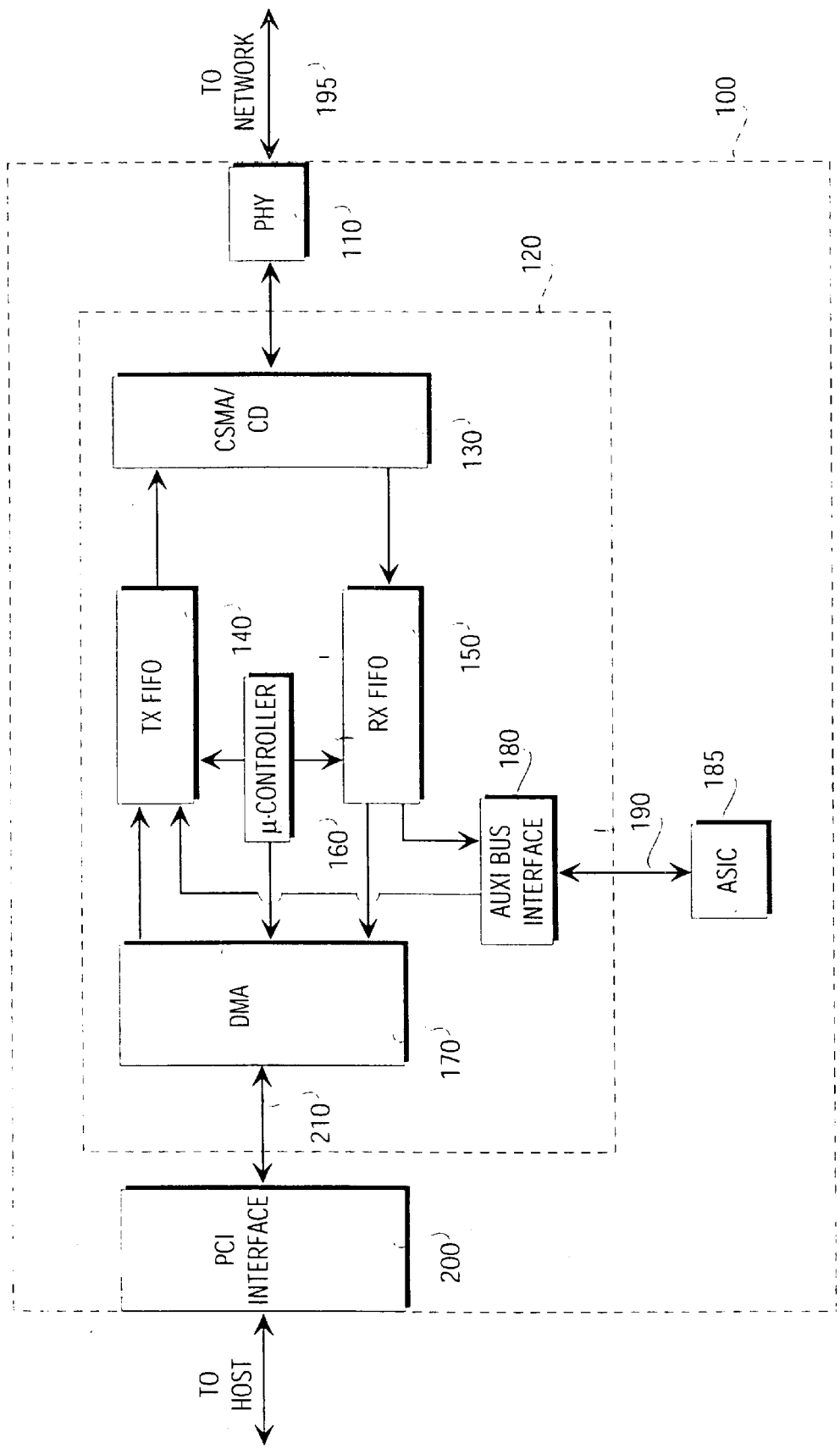
FIG. 1 is a block diagram illustrating an embodiment of a network controller in accordance with the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in details so as not to obscure the present invention.

As previously indicated, it may be desirable for a computer system to be serviced and/or diagnosed over a network. In such a situation, it would be desirable if it were possible to do this even when the computer system either was not functioning or not functioning properly. A way to do this includes a coprocessor or a special purpose integrated circuit, such as an application specific integrated circuit (ASIC), other than the main processor for the host computer system, to be used for management of the local system by a remote management application, although the invention is not limited in scope to the use of a coprocessor or ASIC. If such a special purpose integrated circuit or coprocessor, for example, is included, it would also be desirable to provide a separate communications path other than the one used by applications operating on the main or primary operating system of the host computer system. This way, this separate communications path may be used by the management coprocessor or ASIC even during times when the main or primary communications path may be unavailable. In such a system, the ASIC or coprocessor may be employed to monitor the operational capability of the system and transmit, through or via a network controller, messages which might be directed over a network to a remote management application to notify the application of existing or imminent problems and/or conditions of the local system. This separate communications path or auxiliary bus connection to the network controller may receive packets from auxiliary logic in the computer system which are to be transmitted out over the network via a link.

In one embodiment, although the invention is not limited in scope in this respect, an auxiliary bus that is much slower and, therefore, less expensive, than the main or primary bus connection may be employed. Likewise, packets sent to the network controller over the auxiliary bus may be introduced to and become part of the regular network transmit flow for the computer system. Likewise, the bus may be operational and allow communications even when the primary processor and the primary bus are unavailable during, for instance, the pre-boot period or after a system hardware or software crash.

Currently, standard network communications rely on the main system processor and main input-output (I/O) bus. Therefore, if either is not functioning or the main operating system is not operating normally on the main processor, no network communication may nonetheless occur. Therefore, an advantage of this approach is reliable communications for any purpose by an auxiliary processor being able to occur independently of the operation of the primary computer system.

In order for the coprocessor or ASIC, for example, to receive messages from a remote management application, the network interface controller should include the capability to recognize such messages and then route them over the auxiliary bus. One difficulty, of course, is complying with legacy transport-protocols, although the invention is not limited in scope in this respect and may employ non-legacy protocols as well. For example, although, again, the invention is not limited in scope in this respect, some typical networks employ or comply with the well-known Ethernet protocol or with a token ring protocol, for example. The Ethernet protocol is described in the IEEE 802.3 specification, published in 1996, (hereinafter referred to as the "Ethernet specifications"). Another well-know protocol is the Gigabit Ethernet protocol describe in the IEEE 802.3z specification (hereinafter referred to as the "Gigabit Ethernet specification"). These specifications are available from the IEEE Standards Department, Copyright Information, 445 Hoes Lane, P. O. Box 1331, Piscataway, N.J.08855-1331. See, for example, the CSMA/CD Access Method Standards Package, also available from the IEEE.

FIG. 1 is a block diagram illustrating an embodiment of a network controller or network interface controller in accordance with the present invention. Although the invention is not limited in scope in this respect, this particular embodiment may reside on the motherboard in a PC, for example. Alternatively, an embodiment of a network controller in accordance with the present invention may be included in a network interface unit or network interface card, as another example. Embodiment 100 includes integrated circuit (IC) chip 120, although, in alternative embodiments, the components illustrated need not reside on an IC or be embodied in a single IC.

In this particular embodiment, chip or IC 120 includes components that provide the functionality of a media access controller (MAC) layer. For example, as illustrated in FIG. 1, IC 120 includes a transmit first-in, first out (FIFO) unit 140, a receive FIFO unit 150, a microcontroller 160, and a CSMA/CD or Ethernet specification-compliant interface unit 130. Furthermore, IC 120 includes a direct memory addressing (DMA) unit 170 that couples to a Peripheral Component Interconnnect (PCI) interface unit 200 via a bus 210, that is a PCI specification-compliant interface unit and bus, in this particular embodiment. The PCI local bus specification 2.0 or 2.1 (hereinafter, "PCI specification") is well-known and available from the PCI Special Interest Group, 2575 NE Kathryn Street #17, Hillsboro, Oreg. 97124. Of course, the invention is not limited in scope to complying with the PCI specification. PCI interface 200 couples to a bus that couples to the host computer system. Therefore, in this embodiment, signals that comply with the PCI specification are communicated via PCI interface 200 over the PCI bus with the host computer system. Likewise, IC 120 is coupled to PHY layer 110, which may be employed to couple to a network via a network link along bus 195. Additionally, in this particular embodiment, chip or IC 120 includes an auxiliary bus interface unit 180 which couples to an auxiliary bus 190. Auxiliary bus 190 is employed to communicate with the previously described ASIC or coprocessor, designated 185 in FIG. 1, as previously described.

In this particular embodiment, although the invention is not limited in scope in this respect, transmit FIFO 140 accumulates several bytes and once the FIFO has a sufficient number, the binary digital signals are transmitted over the network via the network link bit-by-bit in this particular embodiment. Of course, the invention is not limited in scope in this respect. Likewise, when the FIFO receives a sufficient number of bytes, DMA 170 attempts to access the PCI bus so that the binary digital signals may be transferred to an available buffer(s) on the host computer system. However, because the PCI bus may be busy performing other operations, an interrupt may be generated on the local system to provide the opportunity for this transfer to occur. Therefore, the FIFO provides the capability for binary digital signals to be stored for those periods in which the PCI bus is not immediately available to be accessed.

As previously described, auxiliary bus interface 180 in this particular embodiment operates at a frequency less than the main communication path, such as 210. Therefore, for example, whereas communication path 210 may operate at several hundred megabytes per second, auxiliary bus 190 may operate at several kilobytes per second. Therefore, in this particular embodiment, although the invention is not limited in scope in this respect, auxiliary bus interface unit 180 includes the capability to disable DMA 170 for selected periods. One advantage of providing this capability is that it prevents DMA 170 from interfering with interface unit 180 performing its operations since DMA 170 has a much higher speed capability.

As previously indicated, ASIC 185, or an alternative processor, coprocessor, or the like in another embodiment, may provide remote management capability. For example, although the invention is not limited in scope in this respect, ASIC 185 may have the capability to monitor aspects of computer system operation, such as system temperature, selected voltage variations, unauthorized intrusion into the system, and other functions. For example, although the invention is not limited in scope in this respect, in one embodiment, ASIC 185 may be preprogrammed to produce a signal packet as an alert and then transmit the packet via auxiliary bus 190, interface unit 180 and IC 120 over or through a network to a remote management application.

In this particular embodiment, although the invention is not limited in scope in this respect, auxiliary bus 190 and interface unit 180 have identical access to the contents of FIFOs 140 and 150 as the host computer system has via the PCI bus and PCI interface 200. However, in this particular embodiment, this parallel access is via a low speed connection. Of course, to accomplish this, one aspect of interface unit 180 is that it perform an arbitration operation so that the low speed connection provided by auxiliary bus 190 may successfully interoperate with the high speed connection provided via bus 210 and PCI interface 200.

One aspect of this particular embodiment of a network controller in accordance with the present invention relates to recognizing packets received via the network link so that such packets may be forwarded along auxiliary bus 190 to ASIC 185, instead of being forwarded to the host computer system via bus 210 and PCI bus interface 200. Likewise, it is also desirable that the received packet be transport-protocol compliant so that it may be processed like any other packet transmitted over a network transport.

Figure 2:
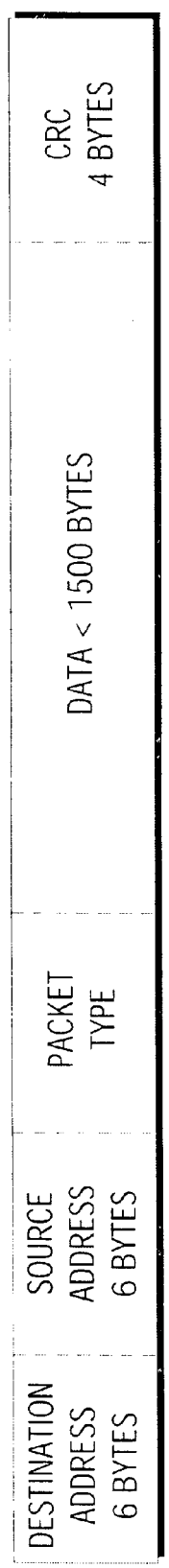
FIG. 2 is a diagram illustrating a transport-protocol compliant signal packet that may be processed by an embodiment of a network controller in accordance with the present invention.

One embodiment, although the invention is not limited in scope in this respect, is illustrated in FIG. 2. This particular embodiment complies with a pre-existing transport protocol, in this particular embodiment the Ethernet protocol, although, again, the invention is not limited in scope in this respect. The desirability of employing a pre-existing protocol is the existence of legacy systems and avoiding or reducing the cost of upgrading existing systems and networks while also providing the capability previously described. In this embodiment, because such legacy or pre-existing transport-compliant protocols were not designed to provide this particular functionality or capability, logic is included to process a received transport-protocol compliant packet properly. With such logic, the packet is processed so that at least some portions of the packet may be forwarded along an auxiliary bus, such as bus 190.

As illustrated in FIG. 2, for this particular embodiment, the packet format includes a destination address 410, a source address 420, a packet type 430, a payload 450, and a cyclical redundancy check (CRC) 460. In this particular embodiment, as illustrated in FIG. 3, packet type includes a variety of other information employed in this particular embodiment. Specifically, the frame type indicates that the packet is an internet protocol (IP) packet. In this particular embodiment, this is indicated by 800, hexadecimal, as indicated in FIG. 3. Likewise, the packet either uses protocol TCP or protocol UPD in this embodiment. In this particular embodiment, because the protocol type is indicated by a fixed location field in the header of the signal packet, the destination port is employed to indicate to the network controller that the packet should be forwarded via the auxiliary bus. For example, in this particular embodiment, the destination port for a received packet that had at least portions to be forwarded is 623, decimal, whether the protocol indicated is TCP or UDP, although the invention is not limited in scope in this respect.

In this particular embodiment, when a network controller receives a packet having a header that complies with or provides the specific binary digital signals previously described, the packet is recognized as a special management packet. In this embodiment, the packet is not reported to the main or primary system software on the computer system. Instead, it is routed via the auxiliary bus connected to the management coprocessor or ASIC, for example. In this particular embodiment, via this technique, even when the main system or operating system is unavailable, such as pre-boot or after an operating system crash, for example, the management coprocessor or ASIC may receive packets, such as, for example, an instruction to reboot the crashed computer, via the auxiliary bus. In another embodiment, although the invention is not limited in scope in this respect, the network controller may in addition, also verify a packet's IP destination address(es) and a recipient machine's IP address. However, this would be desirable in computers that perform routing function, as opposed to a typical host computer.

One aspect of this particular embodiment of the invention is the use of the destination port locations in the header of an Ethernet protocol compliant packet. Typically, these locations, which provide a fixed, predetermined location in the header of the signal packet, are employed by higher level software, such as, for example, the socket layer of the communications stack. A difference here is that, instead, the network controller, at the hardware level, may examine these fixed, predetermined locations in the header of an Ethernet packet for specific binary digital signal to determine whether or not to route or redirect the packet or portions of the packet, so that, for example, it will ultimately be transmitted via the auxiliary bus. As previously indicated, this provides an advantage in that such signaling has backward compatibility or complies with legacy systems and, therefore, the cost of upgrading existing systems may be reduced or avoided while accomplishing the desirable result of signaling that a received transport-protocol compliant packet, or portions thereof, is to be directed or forwarded to the auxiliary bus interface or to some other location so that the packet or portions of the packet ultimately are transmitted along the auxiliary bus. Therefore, this use of the pre-existing transport protocol provides an independent communications path for the computer with a processor or ASIC other than the host processor. Therefore, such an independent communications path will provide the capability to perform operations and remote management and servicing that previously were not available, such as, for example, to remotely boot the computer, to stop the computer, to diagnose and service software on the host, and other operations that would be difficult or impossible to perform when the host is operating under a normal operating system. Another capability, although the invention is not limited in scope in this respect, is for the ASIC or coprocessor to generate a "beat" packet while the host processor or host computer system has been put to sleep. This signals to the remote management application that the computer system is functioning properly while maintaining the computer system in a low power state, nonetheless.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A network controller comprising: a media access controller (MAC) layer, a physical protocol layer (PHY), a Peripheral Component Interconnect (PCI) bus interface, and an auxiliary bus interface;

said PCI and auxiliary bus interfaces being coupled in said network controller so as to transmit to and to receive from a network link binary digital signals, the binary digital signals forming transport-protocol compliant packets, via said MAC and PHY layers;

wherein said MAC layer is capable of processing and directing at least portions of received packets to an auxiliary bus capable of being coupled to said auxiliary bus interface based, at least in part, on specific binary digital signals provided in fixed, predetermined locations in the received transport-protocol compliant packets.

2. The network controller of claim 1, wherein the transport protocol comprises a pre-existing transport protocol.

3. The network controller of claim 2, wherein the pre-existing transport protocol comprises the Ethernet protocol.

4. The network controller of claim 3, wherein the fixed predetermined locations comprise locations in the header of an Ethernet-protocol compliant packet.

5. The network controller of claim 3, wherein the fixed predetermined locations comprise the locations for the designation of the destination port in an Ethernet-protocol compliant packet.

6. The network controller of claim 1, and further comprising a PC motherboard;

said network controller being included with said motherboard and capable of being operable with at least some of said motherboard components.

7. The network controller of claim 6, and further comprising a network interface unit;
said network interface unit capable of being operable with said network controller.

8. A method of directing packets, or portions thereof, received in a network controller to an auxiliary bus comprising:
receiving a transport-protocol compliant packet, the packet being received by the network controller after transport via a network link;
processing the transport-protocol compliant packet; and
directing at least portions of the received transport-protocol compliant packet to the auxiliary bus based, at least in part, on specific binary digitals contained in fixed, predetermined locations in the received transport-protocol compliant packet.

9. The method of claim 8, wherein the transport protocol comprises a pre-existing transport protocol.

10. The method of claim 9, wherein the pre-existing transport protocol comprises the Ethernet protocol.

11. The method of claim 10, wherein the fixed predetermined locations comprise locations in the header of an Ethernet-protocol compliant packet.

12. The method of claim 11, wherein the fixed predetermined locations comprise the locations for the designation of the destination port in an Ethernet-protocol compliant packet.

13. A method of processing received transport protocol-compliant signal packets comprising:
forwarding at least portions of the received transport-protocol compliant signal packet to an auxiliary bus based, at least in part, on specific binary digital signals contained in fixed, predetermined locations in the received transport-protocol compliant packet.

14. The method of claim 13, wherein the transport protocol comprises a pre-existing transport protocol.

15. The method of claim 14, wherein the pre-existing transport protocol comprises the Ethernet protocol.

16. The method of claim 15, wherein the fixed predetermined locations comprise locations in the header of an Ethernet-protocol compliant packet.

17. The method of claim 16, wherein the fixed predetermined locations comprise the locations for the designation of the destination port in an Ethernet-protocol compliant packet.

18. An Integrated circuit comprising:
logic to process a received transport-protocol compliant packet;
said logic being adapted to forward at least some portions of the packet so that the portions will be transmitted along an auxiliary bus;
the portions being forwarded based, at least in part, on specific binary digital signals being provided in fixed, predetermined locations in the packet.

19. The integrated circuit of claim 18, wherein the transport protocol comprises a pre-existing transport protocol.

20. The integrated circuit of claim 19, wherein the pre-existing transport protocol comprises the Ethernet protocol.

21. The integrated circuit of claim 20, wherein the fixed predetermined locations comprise locations in the header of an Ethernet-protocol compliant packet.

22. The integrated circuit of claim 21, wherein the fixed predetermined locations comprise the locations for the designation of the destination port in an Ethernet-protocol compliant packet.

23. The integrated circuit of claim 18, and further comprising a PC motherboard;
said integrated circuit being included with said motherboard and capable of being operable with at least some network controller components.

24. The integrated circuit of claim 23, and further comprising a network interface unit;
said network interface unit capable of being operable with said network controller.

25. A network controller comprising:
a media access controller (MAC) layer capable of processing and directing at least portions of one or more received transport-protocol compliant packets to an auxiliary bus based, at least in part, on specific binary digital signals provided in fixed, predetermined locations, other than a MAC header, in the received transport-protocol compliant packets.

26. The network controller of claim 25, wherein the MAC layer is capable of directing the received transport-protocol compliant packets to a host when a destination address included in the MAC header portion matches an address for the host.

27. The network controller of claim 26, wherein the transport-protocol compliant packets are directed to the host via a Peripheral Component Interconnect (PCI) bus interface.

28. The network controller of claim 25, wherein the transport-protocol comprises a pre-existing transport-protocol.

29. The network controller of claim 28, wherein the fixed, predetermined locations comprise locations in a header of an Ethernet-protocol compliant packet.

30. The network controller of claim 25, wherein the fixed, predetermined locations comprise locations in an Internet Protocol (IP) or Transmission Control Protocol (TCP) header portion of a transport-protocol compliant packet.

* * * * *

UNITED STATES PATENT AND TRADEMARK OFFICE
CERTIFICATE OF CORRECTION

PATENT NO. : 6,385,211 B1
DATED : May 7, 2002
INVENTOR(S) : Williams et al.

It is certified that error appears in the above-identified patent and that said Letters Patent is hereby corrected as shown below:

<u>Column 3,</u>
Line 5, after "may", delete "nonetheless".

<u>Column 5,</u>
Line 52, delete "addresse(es)", insert -- address(es) --.
Line 54, before "routing", insert -- a --.

Signed and Sealed this

Seventeenth Day of September, 2002

*Attest:*

*Attesting Officer*

JAMES E. ROGAN
*Director of the United States Patent and Trademark Office*